United States Patent [19]
Pike et al.

[11] Patent Number: 5,873,544
[45] Date of Patent: Feb. 23, 1999

[54] SLIDABLE DUCT ASSEMBLY FOR AIRCRAFT ANTI-ICING CONDUIT SYSTEMS

[75] Inventors: Walter E. Pike, Castaic; Jan C. Shafer, Thousands Oaks, both of Calif.

[73] Assignee: Senior Flexonics, Inc., Bartlett, Ill.

[21] Appl. No.: 664,704

[22] Filed: Jun. 17, 1996

[51] Int. Cl.⁶ .............................. B64D 15/04; B64D 45/02
[52] U.S. Cl. .................. 244/1 A; 244/134 B; 239/587.1; 239/DIG. 4; 285/302; 174/51
[58] Field of Search ................................. 244/1 A, 134 A, 244/134 B, 134 C, 214; 138/120; 239/587.1, 587.2, 587.5, DIG. 4; 285/298, 302; 174/51

[56] References Cited

U.S. PATENT DOCUMENTS

| | | | |
|---|---|---|---|
| 4,543,677 | 10/1985 | Haglund et al. | 138/120 X |
| 4,603,824 | 8/1986 | McArdel | 244/134 B |
| 4,615,499 | 10/1986 | Knowler | 244/134 B |
| 4,752,049 | 6/1988 | Cole | 244/134 B |
| 4,976,397 | 12/1990 | Rudolph et al. | 244/134 B |

*Primary Examiner*—William Grant
*Attorney, Agent, or Firm*—Dick and Harris

[57] ABSTRACT

Disclosed is a slidable duct assembly for conducting air from a fixed component to a component that is movable with respect to the fixed component by conducting air from a fixed supply of air, associated with the fixed component, to an air delivery member, movable along with the movable component. The duct assembly contains at least two metallic telescoping, tubular conduit sections for rotatably interconnecting the air supply to the air delivery member, and a pair of electrically-conductible, spaced-apart slide bearings positioned between the inner surface and the outer surface of each adjacent conduit section to electrically bond the duct assembly.

29 Claims, 6 Drawing Sheets

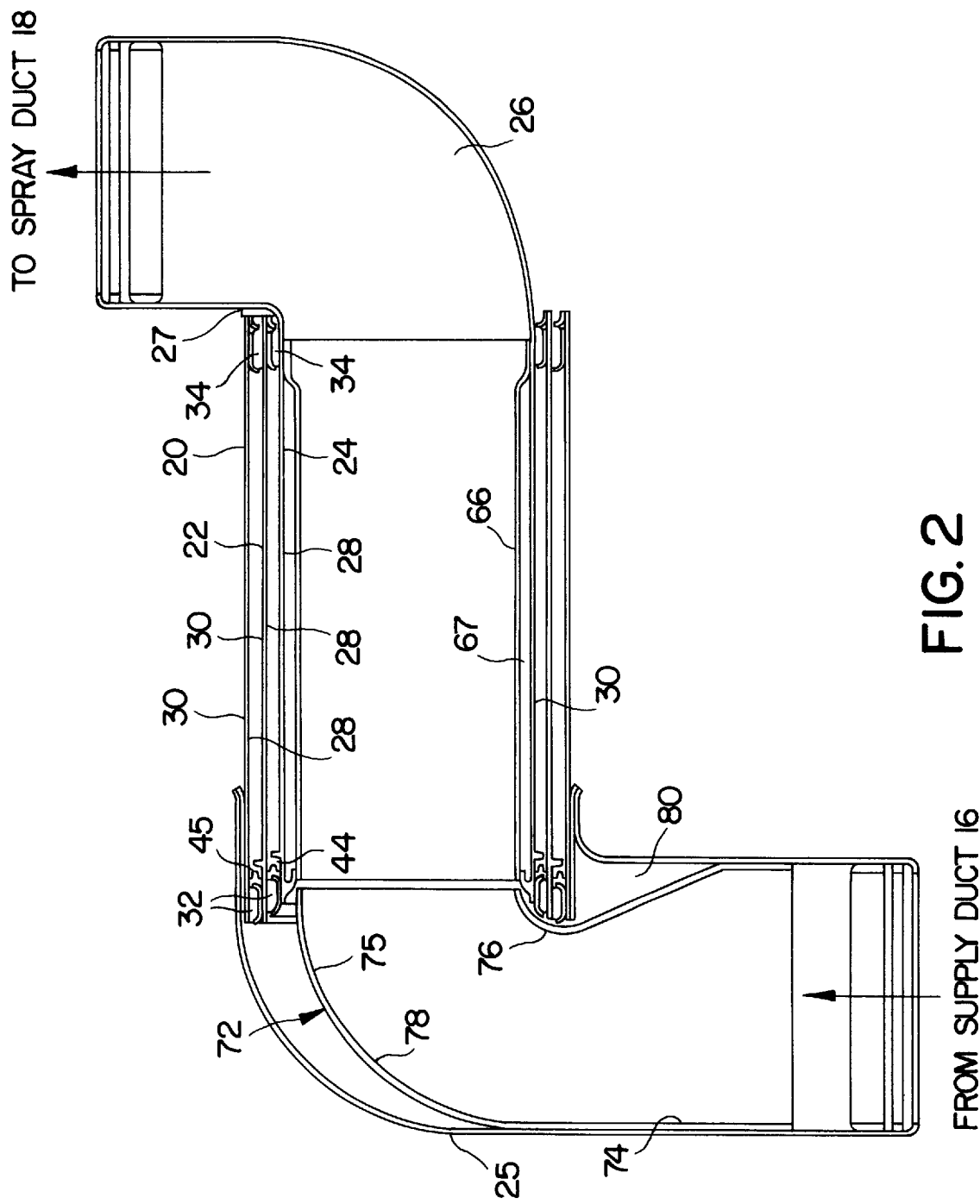

SLIDABLE DUCT ASSEMBLY FOR AIRCRAFT ANTI-ICING CONDUIT SYSTEMS

BACKGROUND OF THE INVENTION

1. Field of the Invention

This invention relates to the mechanical arts. In particular, it relates to a slidable duct assembly for use in aircraft anti-icing conduit systems.

2. Discussion of the Related Art

As is well-known, jet aircraft engines provide the thrust needed to propel jet aircraft. Additionally, by redirecting a portion of the compressed, bleed air produced by the engines through a conduit system, the air can be used for a variety of other purposes. These other purposes include pressurizing, heating, and cooling the aircraft's cabin, and removing moisture from its front windows. To be effective, the conduit system must not only minimize the escape of the bleed air, but it must withstand the elevated temperatures, often in excess of 650° F., of the bleed air produced by today's jet aircraft.

Another important use for the bleed air is to de-ice the aircraft wings' leading edges, wing slats and elevons. For example, to de-ice the movable slats located on the leading edge of the aircraft wings, hot, compressed, bleed air is transferred through conduit sections from a supply duct running lengthwise in the wings' leading edge to a spray duct running lengthwise in the wings' slats. The spray duct has openings to deliver the bleed air to the interior surface of the slats.

Special considerations are involved in the anti-icing conduit systems used to de-ice movable portions of the aircraft, such as wing slats and elevons, that must undergo a wide range of motions as they are extended and then retracted. In order to track the movement of these components, the conduit system must contain at least two slidable and rotatable conduit sections. Conventional duct assemblies are formed from metallic, tubular, telescoping conduit sections. To maintain the air pressure within the assembly, each conduit section is sealed with an elastomeric seal. It is a drawback of such seals, that they become unstable, if the telescoping conduit sections extend and retract relatively long distances. To overcome this drawback, slide bearings must be provided to give the necessary stability to the duct assembly and to extend the seals' lives.

It is a further drawback of such duct assemblies that the seals electrically insulate the metallic, telescoping conduit sections. This creates the danger of arcing due to static buildup or lightning, thus creating a possible ignition source in the area of the aircraft's fuel storage and distribution systems. Attempts have been made to overcome this problem by the use of flexible wire or cable loops to attach the movable components to the fixed components and provide electrical bonding. A difficulty with the use of flexible wire or cable loops, however, is they can interfere with the extension and retraction of the movable components. Furthermore, they are subject to premature failure because of fatigue.

Accordingly, there has existed a definite need for an improved slidable duct assembly which minimizes the escape of compressed air and is stable at high temperatures, while telescoping over relatively long distances. There has existed a still further need for a slidable duct assembly that is electrically bonded without the use of cumbersome and failure-prone wires or cable loops. The present invention satisfies these and other needs and provides further related advantages.

SUMMARY OF THE INVENTION

Now in accordance with the invention there has been found an improved, pressurized, slidable duct assembly for conducting compressed air from a fixed component to a component, that is movable with respect to the fixed component. The duct assembly conducts air from a fixed means for supplying the air, associated with the fixed component, to a means for delivering the air, movable along with the movable component. The duct assembly is formed of at least two metallic, telescoping, tubular conduit sections that rotatably interconnect the supply means to the delivery means. Each conduit section has an inner surface and an outer surface. Disposed between opposing inner and outer surfaces on each pair of adjacent conduit sections are an upstream and a spaced-apart downstream annular slide bearing. A seal disposed between each set of slide bearings, preferably adjacent the upstream slide bearing, substantially prevents the escape of compressed air from the pressurized duct assembly. The slide bearings provide for electrical bonding between the telescoping conduit sections, while stabilizing the seals and lubricating the opposing inner and outer surfaces.

In preferred embodiments, the slidable duct assembly interconnects an air supply duct running lengthwise in a fixed portion of an aircraft wing to a spray duct running lengthwise in a movable wing slat or elevon. Further, in some embodiments, each downstream slide bearing is affixed to the inner surface and each upstream bearing is affixed to the outer surface of each pair of opposing inner and outer conduit section surfaces.

BRIEF DESCRIPTION OF THE DRAWINGS

FIG. 2 is a cross-sectional view of the slidable duct assembly shown in FIG. 1 when the duct assembly is retracted;

DETAILED DESCRIPTION OF THE PREFERRED EMBODIMENTS

To exemplify the inventive, pressurized, slidable duct assembly, the following description may concentrate primarily on the de-icing of wing slats located on the leading edge of an aircraft wing. It should be readily apparent to the skilled artisan that the description with little or no modification might also apply to de-icing other movable components, such as the elevons found on the wing's tailing edge.

Figure 1:
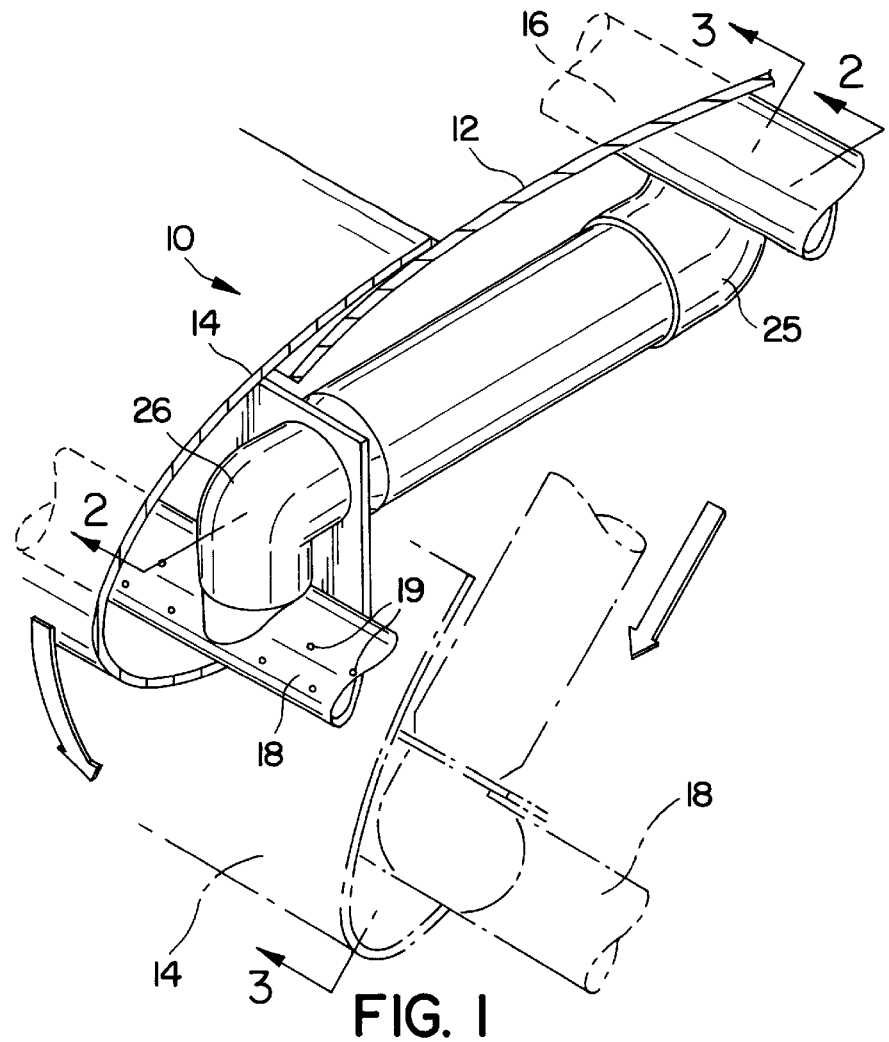
FIG. 1 is a simplified, cross-sectional view of the leading edge of an aircraft wing having a movable slat and a slidable duct assembly in accordance with the invention, the view showing the slat retracted and, by a broken line, the slat extended.

FIG. 1 represents a cross-sectional view of a portion of a leading edge 10 of an airplane wing. The figure has been simplified to help in understanding the conduit system in accordance with the invention. Shown is a fixed portion 12 and a movable wing slat 14. The wing slat is normally retracted to nest against the wing's leading edge when in high-altitude flight and is deployed by a suitable actuator (not shown) into the illustrated broken-line position for take-offs and landings. Hot, compressed, bleed air is conducted from the aircraft engine (not shown) to a suitable transfer point on the wing's leading edge by a supply duct 16 running lengthwise in the wing's leading edge. From the supply duct, the bleed air is conducted to a spray duct 18 running lengthwise in the wing slats. Openings 19 deliver the bleed air to the interior surface of the wing slat.

Figure 3:
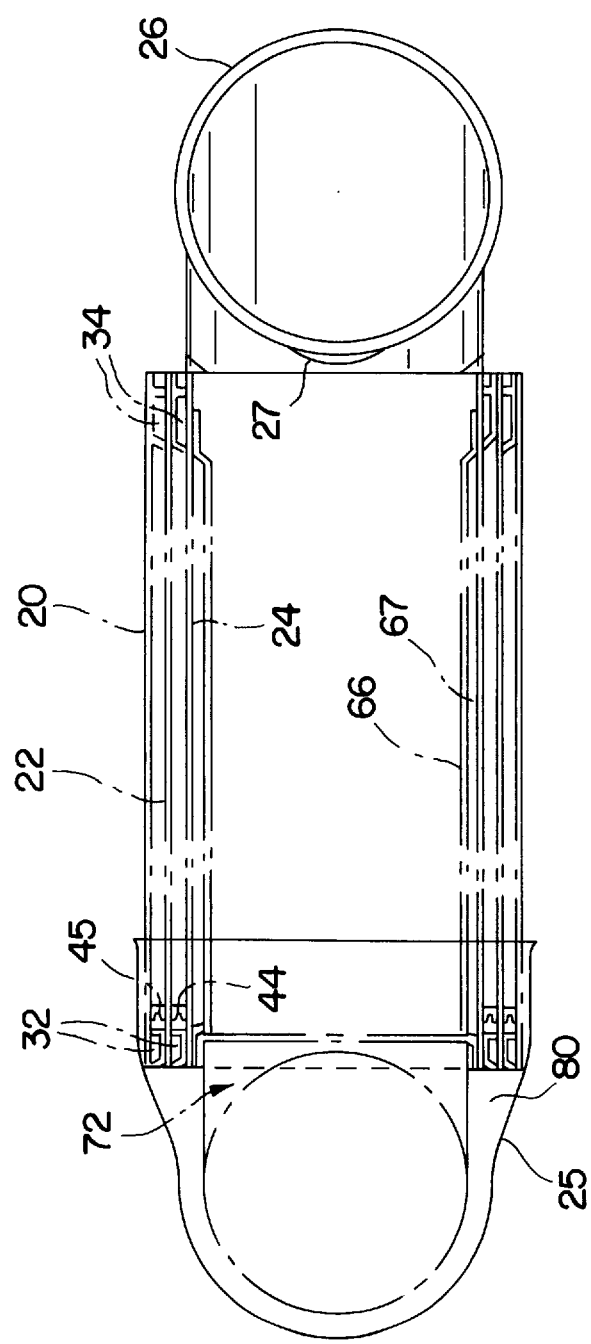
FIG. 3 is a top plan view of the slidable duct assembly shown in FIG. 2 with the inner telescoping conduit sections shown in phantom.
Figure 4:
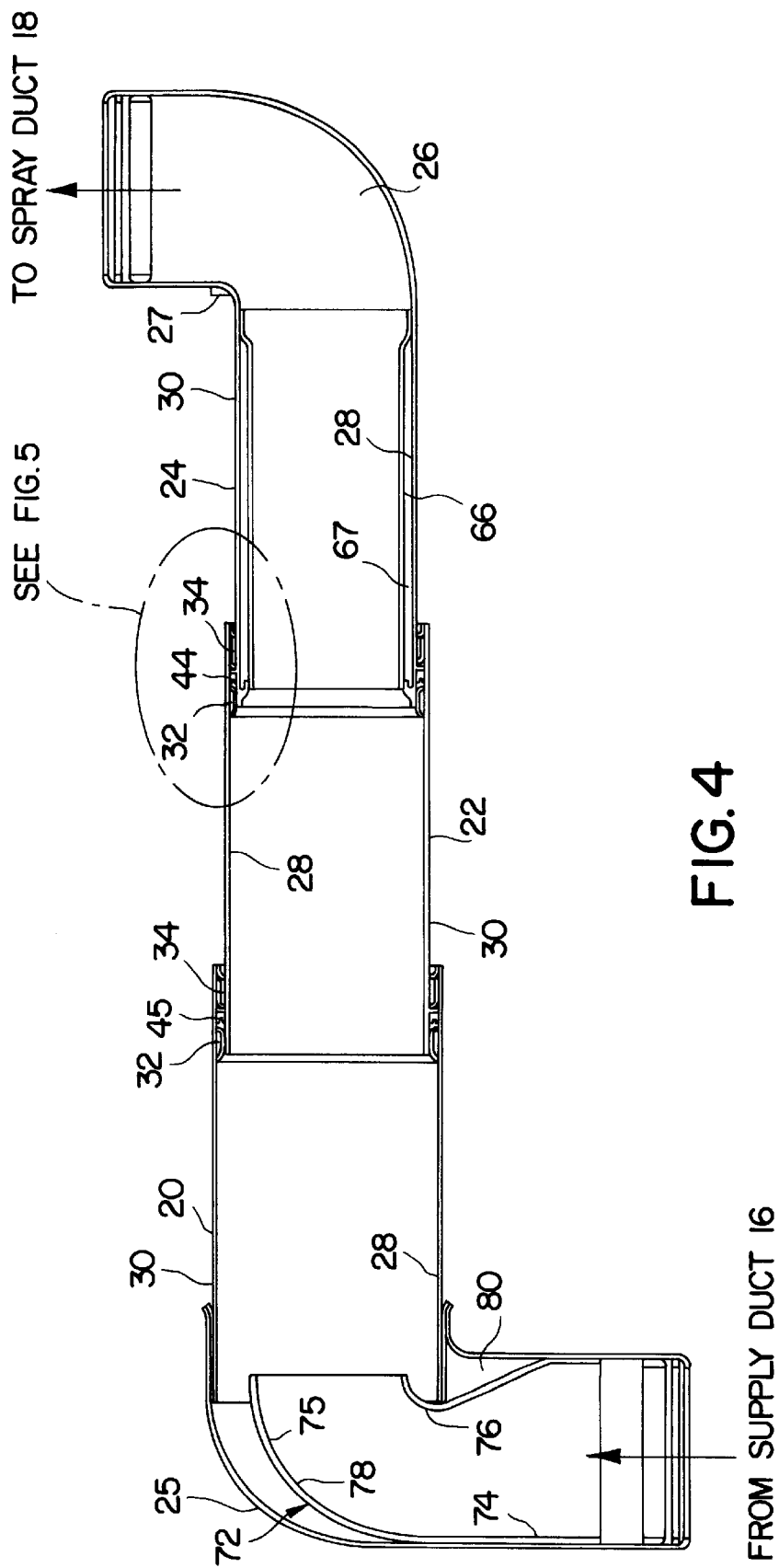
FIG. 4 is a cross-sectional view of the slidable duct assembly shown in FIG. 1 when the duct assembly is extended.

As shown in FIGS. 2–4, the bleed air is conducted by way of a plurality of metallic, telescoping, tubular conduit sections 20, 22 and 24, including an outermost conduit section 20 and an innermost conduit section 24. The tubular conduit sections are used to telescope the duct assembly to the length required for full deployment of the wing slat.

In addition to the telescopic lengthening and shortening of the conduit sections, extension and retraction of the wing slat 14 requires rotation of the conduit sections about the axis of the supply duct 16 and about the axis of the spray duct 18. To this end, an elbow-shaped upstream transitional joint 25 forms a substantially gas-tight seal with the outermost conduit section 20 and rotatably interconnects the supply duct. Similarly, an elbow-shaped downstream transitional joint 26 forms a substantially gas-tight seal with the innermost conduit section 24 and rotatably interconnects the spray duct. A compression stop 27, resistance welded to the downstream joint helps to axially position the conduit sections when the duct assembly is fully retracted.

Each conduit section has an inner surface 28 and an outer surface 30, so that for each pair of adjacent conduit sections the outer section's inner surface opposes the inner section's outer surface. Disposed between each pair of opposing inner and outer surfaces 28 and 30 are an upstream annular slide bearing 32 and a downstream annular slide bearing 34. The slide bearings are affixed at the ends of the duct sections to maximize the stiffness of the duct assembly in all positions.

Figure 5:
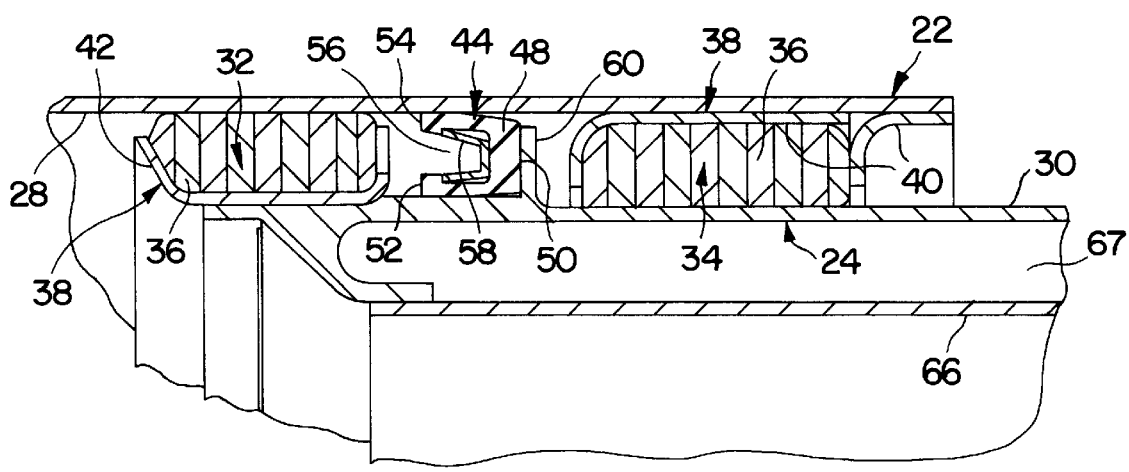
FIG. 5 is an enlarged view of a portion of FIG. 4 detailing the slide bearings and seals.

Turning additionally to FIG. 5, to allow extension and retraction of the conduit sections, the upstream slide bearing 32 is affixed to the outer surface 30 of the innermost conduit section for each pair of opposing inner and outer conduit section surfaces. The upstream bearing slidably engages and presses outward against the opposing inner surface 28, thus permitting relative movement between the upstream slide bearing and the outermost conduit section. The downstream slide bearing 34 is affixed to the inner surface of the outermost conduit section for each such pair of conduit section surfaces. The downstream slide bearing slidably engages and presses inward against the opposing outer surface to permit relative movement between the downstream slide bearing and the innermost conduit section.

Each slide bearing is formed of an annular slide bearing ring 36 longitudinally affixed in an annular retainer 38. The slide bearing ring is made of a suitable material having a low coefficient of friction and capable of withstanding the extreme temperature variations likely to be encountered during flight. Importantly, the material must be sufficiently electrically conductive to provide an acceptable drain for any stray currents resulting from lightning, static electricity or the like. The electrical resistance of the duct assembly is preferably less than about 1 ohm, more preferably about 0.2 ohm.

Figure 7:
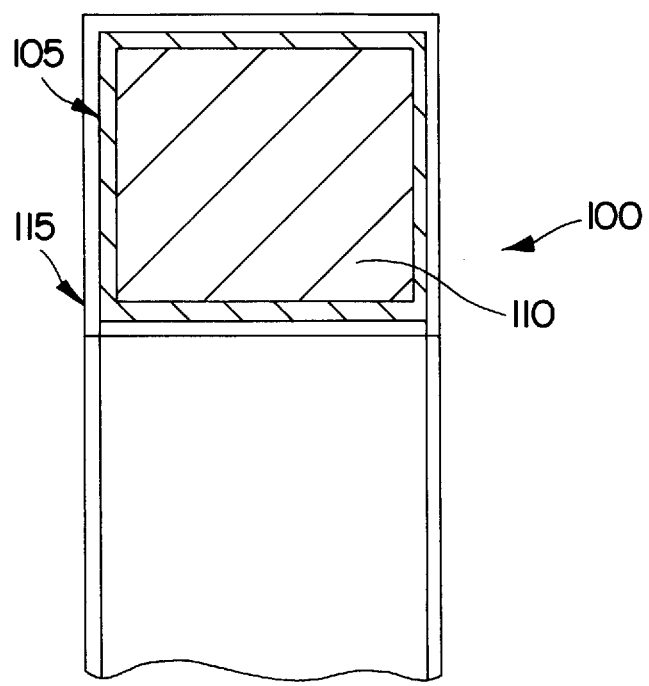
FIG. 7 is a fragmentary sectional schematic illustration of a portion of a slide bearing ring fabricated according to the principles of the present invention.

A suitable slide bearing ring is made from a "wire" 100 formed by twisting aluminum foil 105 around a soft fiberglass core 110. The resulting wire is then crushed into a 3/16" square packing strand and cut into the desired length. The packing strand is lubricated using a mixture of a high temperature lubricant (Fel-Pro C-300, available from Fel-Pro, Inc., Skokie, Ill.) and a solid graphite powder (available from Electrofilm, Inc., Valencia, Calif.) at a mixture ratio of about 1 gallon lubricant to about 0.25 pounds graphite powder. The packing strand is dipped and redipped into the mixture until a buildup of lubricant 115 of 0.010 to 0.015 inch of the mixture is achieved. Following lubrication, the packing strand is air-dried at room temperature. After the packing strand has been lubricated and dried, it is formed into the annular slide bearing ring using a form tool and applying approximately 4000 force-pounds of load. FIG. 7 is a fragmentary sectional schematic illustration of a portion of a slide bearing ring fabricated according to the principles of the present invention, shown after application of the lubrication material, and formation into a ring.

In the embodiment shown in FIG. 5, the retainer for the downstream slide bearing ring is constructed from two radially-extending L-shaped members 40 fusion or resistance welded to the inner surface 28 of conduit section 22. The retainer for the upstream side bearing ring is constructed from a single U-shaped member fusion or resistance welded to the outer surface 30 of duct conduit 24. The upstream leg 42 of the U-shaped member is outwardly tapered. As best seen in FIG. 4, the taper improves the aerodynamics of the flow of bleed air, as the bleed air passes from one telescoping conduit section to an adjacent, telescoping conduit section of a smaller diameter.

Turning additionally to FIGS. 2–4, the pressurized assembly is made substantially airtight by sealing the opposing inner and outer surfaces 28 and 30 on each of the adjacent conduit sections with a seal disposed between the upstream and the downstream slide bearings 32 and 34. An innermost seal 44 is located between the innermost conduit section 24 and the adjacent conduit section 22. Located between the outermost conduit section 20 and the adjacent conduit section 22 is an outermost seal 45.

Each seal is formed of a resilient, annular seal ring 48 having a base 50 and, extending in an outward direction from the base, inner and outer lips 52 and 54, respectively. The seal ring is preferably made of a high temperature-resistant, fluorocarbon material, most preferably, a plastic reinforced polyethylenetetrafluoride material to provide superior heat and wear resistance. The seal ring forms a pressure-energized, gas pocket 56 that is reinforced and further energized by a V- or U-shaped stainless steel spring 58. To maximize the effectiveness of the slide bearings in stabilizing the seals, as well as to maximize the extensibility of each conduit section, each seal is placed adjacent a slide bearing. Furthermore, by placing each seal adjacent an upstream slide bearing 32, the seals are protected from direct impingement by the hot bleed air.

A flange 60 extending radially from each outer surface abuts the upstream base 50 and secures each seal longitudinally. The location of the flanges is such that they also act as stops for the downstream slide bearings 34 and help to position the conduit sections 20, 22, and 24 when the duct assembly is fully extended (FIG. 4). This is particularly advantageous in embodiments containing more than two telescoping conduit sections, because the flanges, along with compression stop 27, operate as a series of interrelated stops assuring that the middle conduit section 22 is deployed during extension and retraction and properly positioned when the assembly is retracted.

Another feature is best seen in FIGS. 2–4. A tubular double-wall 66, spaced-apart from the inner surface 28 of the innermost conduit section 24, extends substantially the entire length of the duct section to create an annular airspace 67. The innermost seal 44 is located so that it is opposite the annular airspace at all times. In operation, the annular airspace created by the double-wall fills with relatively stagnant bleed air, so that when the innermost seal and bearings are opposite the airspace they are insulated and, thereby, protected from direct flow of bleed air.

A second double-wall forms an elbow-shaped inner channel 72. The inner channel has an upstream leg 74 leading to a downstream leg 75 formed with a small radius curve segment 76 and a large radius curve segment 78. The upstream leg is welded to the upstream transitional joint 25. The small radius curve segment is inwardly tapered and the large radius curve segment is made elliptical, so that the downstream leg is spaced-apart from the inner surface of the upstream transitional joint creating a second annular airspace 80. The outermost seal 45 is located so that it is opposite the second annular space when the conduit sections are retracted. During operation, the second annular space also fills with relatively stagnant bleed air. The stagnant bleed air insulates and protects the outermost seal and bearings from direct flow of bleed air when the assembly is retracted.

The size and shape of the cross-section throughout the downstream leg is substantially the same as the size and shape of the cross-section of the tubular double-wall 66. As best seen in FIG. 2, when the wing slat is retracted, the downstream leg 75 is aligned with the tubular double-wall 66 and together they create a substantially smooth surface providing good aerodynamics for the flow of air through the assembly. Furthermore, when the assembly is extended, the inner channel 72 directs the bleed air away from the upstream seals and bearings.

Figure 6:
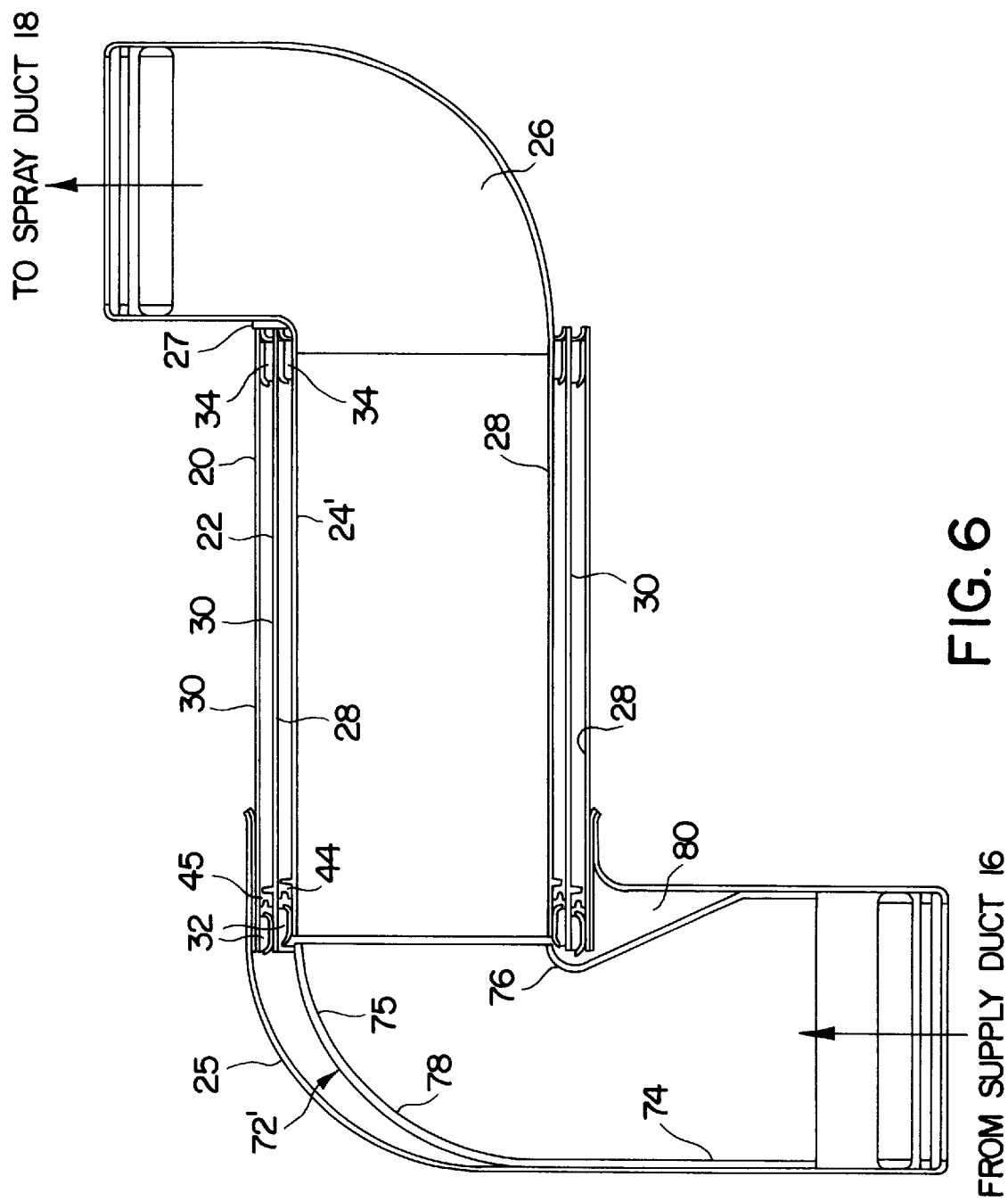
FIG. 6 is a cross-sectional view of another embodiment of a slidable duct assembly in accordance with the invention.

Another embodiment of a slidable duct assembly in accordance with the invention is shown in FIG. 6. In this embodiment, there is no tubular double-wall. The size and shape of the cross-section throughout the downstream leg 72' is substantially the same as the size and shape of the cross-section of the innermost conduit section 24'. When the wing slat is retracted, the downstream leg is aligned with the innermost conduit section to create a substantially smooth surface.

While the invention has been described in detail with reference to certain preferred embodiments thereof, it will be understood that modifications and variations are within the spirit and scope of that which is described and claimed.

That which is claimed is:

1. A slidable duct assembly for conducting air from a fixed component to a component that is movable with respect to the fixed component comprising:

at least two metallic, telescoping, tubular conduit sections for movably interconnecting an air supply means to an air delivery means, each conduit section having an inner surface and an outer surface;

an upstream slide bearing and a spaced-apart downstream slide bearing disposed between said at least two metallic telescoping tubular conduit section surfaces, each slide bearing being fabricated, at least in part, from electrically conductive material, in order to establish an electrically conductive path between opposing inner and outer conduit section surfaces.

2. The slidable duct assembly in accordance with claim 1 wherein the slide bearings have a resistivity of less than about 1 ohm.

3. The slidable duct assembly in accordance with claim 2 wherein the slide bearings comprise an annular retainer longitudinally securing an annular slide bearing ring.

4. The slidable duct assembly in accordance with claim 3 wherein the downstream slide bearing is affixed by the annular retainer to the inner surface and the upstream slide bearing is affixed by the annular retainer to the outer surface for each pair of opposing inner and outer conduit section surfaces.

5. The slidable duct assembly in accordance with claim 4 further comprising a seal disposed between each set of upstream and downstream slide bearings to substantially prevent the escape of air from the duct assembly.

6. The slidable duct assembly in accordance with claim 5 wherein the seal is positioned adjacent the upstream slide bearing for each pair of opposing inner and outer conduit section surfaces.

7. The slidable duct assembly in accordance with claim 2 further comprising a seal disposed between each set of upstream and downstream slide bearings to substantially prevent the escape of air from the duct assembly.

8. The slidable duct assembly in accordance with claim 7 further comprising a seal disposed between each set of upstream and downstream slide bearings to substantially prevent the escape of air from the duct assembly.

9. The slidable duct assembly in accordance with claim 2 wherein the slide bearings have a resistivity of about 0.2 ohm.

10. The slidable duct assembly according to claim 1 further comprising:

at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, proceeding from the upstream region to the downstream region.

11. A slidable duct assembly for conducting air from a fixed component to a component that is movable with respect to the fixed component comprising:

at least two metallic, telescoping, tubular conduit sections for movably interconnecting an air supply means to an air delivery means, each conduit section having an inner surface and an outer surface; and an upstream slide bearing and a spaced-apart downstream slide bearing disposed between each pair of opposing inner and outer conduit section surfaces, each slide bearing being fabricated, at least in part, from electrically conductive material, in order to establish an electrically conductive path between opposing inner and outer conduit section surfaces;

each of the slide bearings having a resistivity of less than about 1 ohm;

each of the slide bearings being formed as an annular retainer longitudinally securing an annular slide bearing ring;

each slide bearing ring comprising a fiberglass core wrapped with aluminum foil treated with a lubricant.

12. The slidable duct assembly in accordance with claim 11 wherein the lubricant comprises a mixture of a high temperature lubricant and a graphite powder.

13. A slidable duct assembly for interconnecting a fixed portion of an aircraft wing to a movable flight control element which is movable between a retracted position and an extended position with respect to the fixed portion comprising:

at least two, metallic telescoping, tubular conduit sections for movably interconnecting an air supply duct to an air delivery duct, each conduit section having an inner surface and an outer surface;

an upstream slide bearing and a spaced-apart downstream slide bearing disposed between said at least two metallic telescoping tubular conduit section surfaces, each slide bearing being fabricated, at least in part, from electrically conductive material, in order to establish an electrically conductive path between opposing inner and outer conduit section surfaces.

14. The slidable duct assembly in accordance with claim 13 wherein the slide bearings have a resistivity of less than about 1 ohm.

15. The slidable duct assembly in accordance with claim 14 wherein the slide bearings comprise an annular retainer longitudinally securing an annular slide bearing ring.

16. The slidable duct assembly in accordance with claim 15 wherein the downstream slide bearing is affixed by the annular retainer to the inner surface and the upstream slide bearing is affixed by the annular retainer to the outer surface for each pair of opposing inner and outer conduit section surfaces.

17. The slidable duct assembly in accordance with claim 16 further comprising a seal disposed between each set of upstream and downstream slide bearings to substantially prevent the escape of air from the duct assembly.

18. The slidable duct assembly in accordance with claim 17 wherein the seal is positioned adjacent the upstream slide bearing for each pair of opposing inner and outer conduit section surfaces.

19. The slidable duct assembly in accordance with claim 14 further comprising a seal disposed between each set of upstream and downstream slide bearings to substantially prevent the escape of air from the duct assembly.

20. The slidable duct assembly in accordance with claim 19 wherein the seal is positioned adjacent the upstream slide bearing for each pair of opposing inner and outer conduit section surfaces.

21. The slidable duct assembly in accordance with claim 14 wherein the slide bearings have a resistivity of about 0.2 ohm.

22. The slidable duct assembly according to claim 13 further comprising:

at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, proceeding from the upstream region to the downstream region.

23. A slidable duct assembly for interconnecting a fixed portion of an aircraft wing to a movable flight control element movable between a retracted position and an extended position with respect to the fixed portion comprising:

at least two, metallic telescoping, tubular conduit sections for movably interconnecting an air supply duct to an air delivery duct, each conduit section having an inner surface and an outer surface; and an upstream slide bearing and a spaced-apart downstream slide bearing disposed between each pair of opposing inner and outer conduit section surfaces, each slide bearing being fabricated, at least in part, from electrically conductive material, in order to establish an electrically conductive path between opposing inner and outer conduit section surfaces;

each of the slide bearings having a resistivity of less than about 1 ohm;

each of the slide bearings being formed as an annular retainer longitudinally securing an annular slide bearing ring;

each slide bearing ring comprising a fiberglass core wrapped with aluminum foil treated with a lubricant.

24. The slidable duct assembly in accordance with claim 23 wherein the lubricant comprises a mixture of a high temperature lubricant and a graphite powder.

25. A slidable duct assembly for interconnecting a fixed portion of a leading edge of an aircraft wing to a wing slat movable between a retracted position and an extended position with respect to the fixed portion comprising:

at least two, adjacent, metallic, telescoping, tubular conduit sections for movably interconnecting an air supply duct to an air delivery duct, each conduit section having an inner surface and an outer surface;

an upstream slide bearing and a spaced-apart downstream slide bearing disposed between said at least two metallic telescoping conduit section surfaces, each slide bearing being fabricated, at least in part, from electrically conductive material, in order to establish an electrically conductive path between opposing inner and outer conduit section surfaces, the slide bearings having a resistivity of less than about 1.0 ohm;

a seal disposed between each of said upstream and downstream slide bearings and adjacent the upstream slide bearing to substantially prevent the escape of air from the duct assembly.

26. The slidable duct assembly in accordance with claim 25 wherein the slide bearings comprise an annular retainer longitudinally securing an annular slide bearing ring.

27. The slidable duct assembly according to claim 5 further comprising:

at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, proceeding from the upstream region to the downstream region.

28. A slidable duct assembly for interconnecting a fixed portion of a leading edge of an aircraft wing to a wing slat movable between a retracted position and an extended position with respect to the fixed portion comprising:

at least two, adjacent, metallic, telescoping, tubular conduit sections for movably interconnecting an air supply duct to an air delivery duct, each conduit section having an inner surface and an outer surface;

an upstream slide bearing and a spaced-apart downstream slide bearing disposed between opposing inner and outer conduit section surfaces, the slide bearings having a resistivity of less than about 1.0 ohm; and a seal disposed between each of said upstream and downstream slide bearings and adjacent the upstream slide bearing to substantially prevent the escape of air from the duct assembly;

each slide ring being formed as an annular retainer longitudinally securing an annular slide bearing ring;

each slide bearing ring comprising a fiberglass core with aluminum foil treated with lubricant.

29. The slidable duct assembly in accordance with claim 28 wherein the lubricant comprises a mixture of a high temperature lubricant and a graphite powder.

* * * * *

UNITED STATES PATENT AND TRADEMARK OFFICE
CERTIFICATE OF CORRECTION

PATENT NO.     : 5,873,544                                           Page 1 of 1
DATED          : February 23, 1999
INVENTOR(S)    : Pike et al.

It is certified that error appears in the above-identified patent and that said Letters Patent is hereby corrected as shown below:

Column 6,
Lines 22-25, during the rearrangement of the claims, the dependency of claim 10 text was changed and should read as follows: -- 8. The slidable duct assembly in accordance with claim 7 wherein the seal is positioned adjacent the upstream slide bearing for each pair of opposing inner and outer conduit section surfaces. --

Column 8,
Line 46, delete "5" and insert -- 1 --

Column 10,
Line 4, after "with" and before "lubricant", insert -- a --

Signed and Sealed this

Twenty-ninth Day of October, 2002

Attest:

Attesting Officer

JAMES E. ROGAN
*Director of the United States Patent and Trademark Office*